US012728809B2

(12) United States Patent
Yamamoto et al.

(10) Patent No.: US 12,728,809 B2
(45) Date of Patent: Sep. 8, 2026

(54) VEHICLE FRONT STRUCTURE

(71) Applicant: HONDA MOTOR CO., LTD., Tokyo (JP)

(72) Inventors: Akihiro Yamamoto, Tokyo (JP); Hiroyuki Ito, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 303 days.

(21) Appl. No.: 18/439,875

(22) Filed: Feb. 13, 2024

(65) Prior Publication Data

US 2024/0270190 A1 Aug. 15, 2024

(30) Foreign Application Priority Data

Feb. 15, 2023 (JP) ................................ 2023-021408

(51) Int. Cl.
*B60R 19/26* (2006.01)
*B60Q 1/04* (2006.01)
*B60R 19/48* (2006.01)
*B60R 21/0136* (2006.01)
*B62D 25/08* (2006.01)

(52) U.S. Cl.
CPC ............ *B60R 19/26* (2013.01); *B60Q 1/0483* (2013.01); *B60R 19/48* (2013.01); *B60R 21/0136* (2013.01); *B62D 25/08* (2013.01)

(58) Field of Classification Search
CPC ..... B60R 19/26; B60R 19/48; B60R 21/0136; B60R 2011/004; B60R 11/00; B60R 21/013; B60Q 1/0483; B60Q 1/0408; B60Q 1/0433; B62D 25/08; B62D 21/152
USPC .................................................... 296/187.09
See application file for complete search history.

(56) References Cited

U.S. PATENT DOCUMENTS 6,357,821 B1 * 3/2002 Maj ...................... B60Q 1/0035 296/203.02
8,651,559 B2 * 2/2014 Kitaizumi ............... B60R 19/12 293/133
11,691,579 B2 * 7/2023 Takahashi ............... B60R 19/12 293/132
12,325,465 B2 * 6/2025 Tashiro ................... B60R 19/34
2002/0129981 A1 * 9/2002 Satou ..................... B62D 35/02 180/68.6
2008/0067838 A1 * 3/2008 Nakamae ............ B62D 25/084 296/203.02
2023/0063579 A1 * 3/2023 Carrillo Fernandez ...................... B60R 19/023
2024/0270317 A1 * 8/2024 Yamamoto ........... B62D 21/152

FOREIGN PATENT DOCUMENTS

JP 2006213185 A * 8/2006
JP 2020158083 A * 10/2020

* cited by examiner

*Primary Examiner* — Jason D Shanske
(74) *Attorney, Agent, or Firm* — Rankin, Hill & Clark LLP

(57) ABSTRACT

A vehicle front structure includes: an upper beam to which a headlight is fixed; a bracket installed side by side with the upper beam and having a front end in a vehicle front-rear direction thereof fixed to a bulkhead and a rear end in the vehicle front-rear direction thereof fixed to a lower member; a shock absorbing bracket arranged so as to be held between the upper beam and the bracket; and an airbag sensor arranged in vicinity to the shock absorbing bracket.

9 Claims, 7 Drawing Sheets

1
2
3
11a
11b
12
13
14
15
16
16
17
18
18
21
22
23
24
25
26
31
31a
31b
31b
31b
31b
31c
31c
VIII
VIII
UP
DOWN
LEFT
RIGHT
FRONT
REAR

VEHICLE FRONT STRUCTURE

CROSS-REFERENCE TO RELATED APPLICATION

This application claims the benefit of priority under 35 U.S.C. § 119 to Japanese Patent Application No. 2023-021408 filed on Feb. 15, 2023, the entire contents of which are incorporated herein by reference.

TECHNICAL FIELD

The present invention relates to a vehicle front structure.

BACKGROUND OF THE INVENTION

There has been a vehicle front structure including a bumper support bracket, as a member to receive an initial impact at a vehicle front, made of resin and having an inner support, to which a collision load is inputted, and a frame, to which a headlamp is fixed, integrally molded (see Japanese Patent Application Publication No. 2006-213185, referred to as Patent Document 1 hereinbelow, for example). The bumper support bracket is attached to a front surface of a radiator side frame on which an airbag sensor is provided. Such a vehicle front structure would have the inner support of the bumper support bracket broken by a tearing stress in early phase of a frontal collision. This allows the vehicle front structure to avoid a noise component being mixed into a G-forces wave, to prevent the airbag sensor from malfunctioning.

SUMMARY

Problems to be Solved

However, a conventional vehicle front structure (see Patent Document 1, for example) has the inner support and headlamp-fixed frame of the bumper support bracket integrally molded, to limit an installation site of the bumper support bracket. Additionally, when one of the inner support and the frame is broken or degraded, this vehicle front structure does not allow the failing one to be individually replaced, to have high replacement costs. Therefore, a conventional vehicle front structure is desired to have higher degree of freedom in design on an installation site of the bumper support bracket (load-inputted part), and reduce replacement costs of the load-inputted part.

The present invention is intended to provide a vehicle front structure having higher degree of freedom in design on an installation site of a load-inputted part, and reducing replacement costs of the load-inputted part.

Solution to Problems

A vehicle front structure according to the present invention, to solve the above-identified problems, includes: an upper beam to which a headlight is fixed; a bracket installed side by side with the upper beam and having a front end in a vehicle front-rear direction thereof fixed to a bulkhead and a rear end in the vehicle front-rear direction thereof fixed to a lower member; a shock absorbing bracket arranged so as to be held between the upper beam and the bracket; and an airbag sensor arranged in vicinity to the shock absorbing bracket.

Advantageous Effects of the Invention

The vehicle front structure of the present invention has higher degree of freedom in design on an installation site of a load-inputted part, and reduces replacement costs of the load-inputted part.

DETAILED DESCRIPTION

First Embodiment

Next, a description is given in detail of an embodiment of a vehicle front structure according to the present invention, with reference to the drawings as required. Note that front-rear, right-left, and up-down directions are based on arrow directions in FIG. 1 aligned with those of a vehicle. Additionally, the vehicle front structure of the present embodiment is bilaterally symmetrical with respect to a centerline extending in the front-rear direction of a vehicle, and a description is given hereinbelow of only a left section of the vehicle front structure and a detailed description on a right section of the same is omitted.

Figure 1:
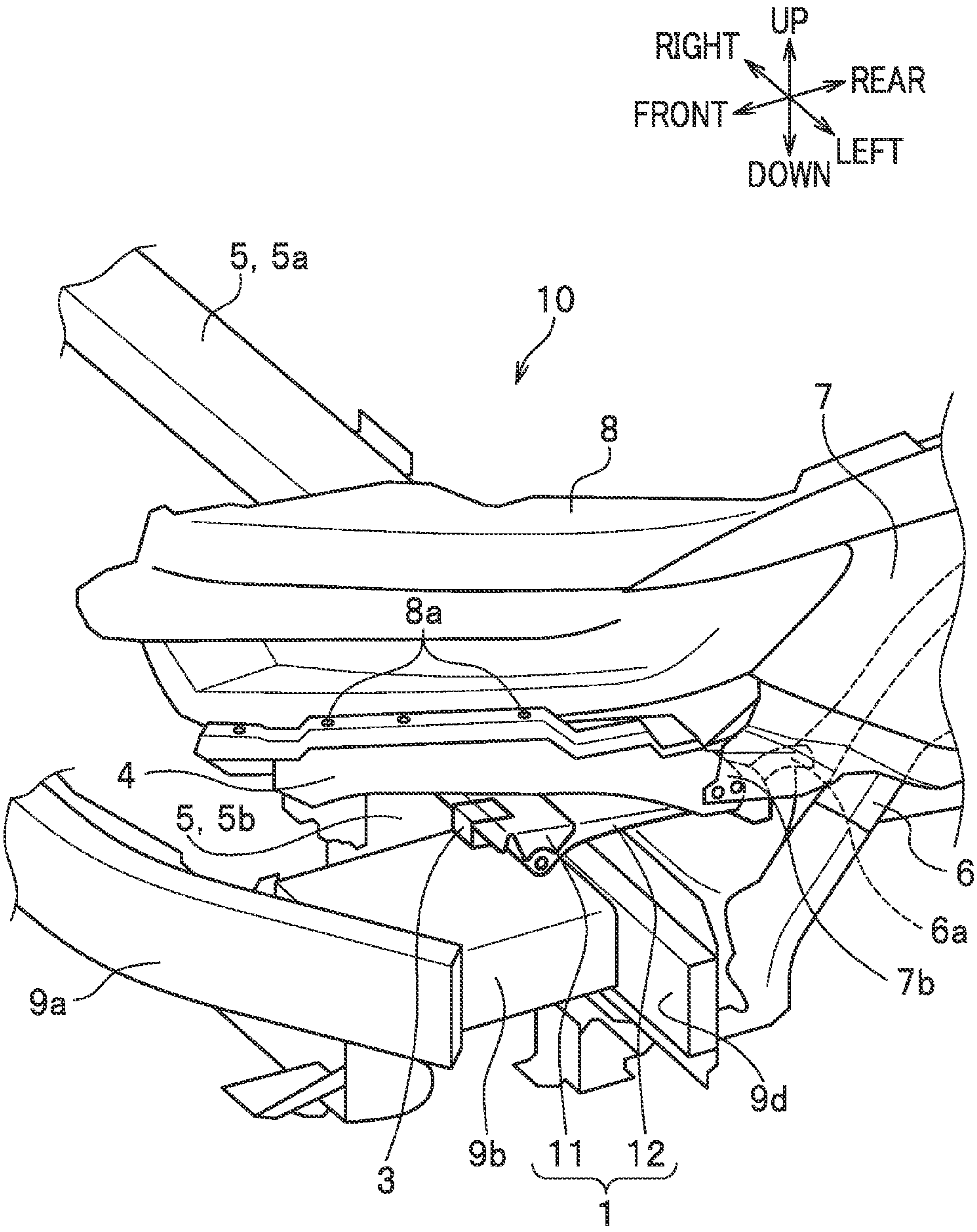
FIG. 1 is a partially-enlarged perspective view of a left section of a vehicle front structure according to an embodiment of the present invention.
Figure 2:
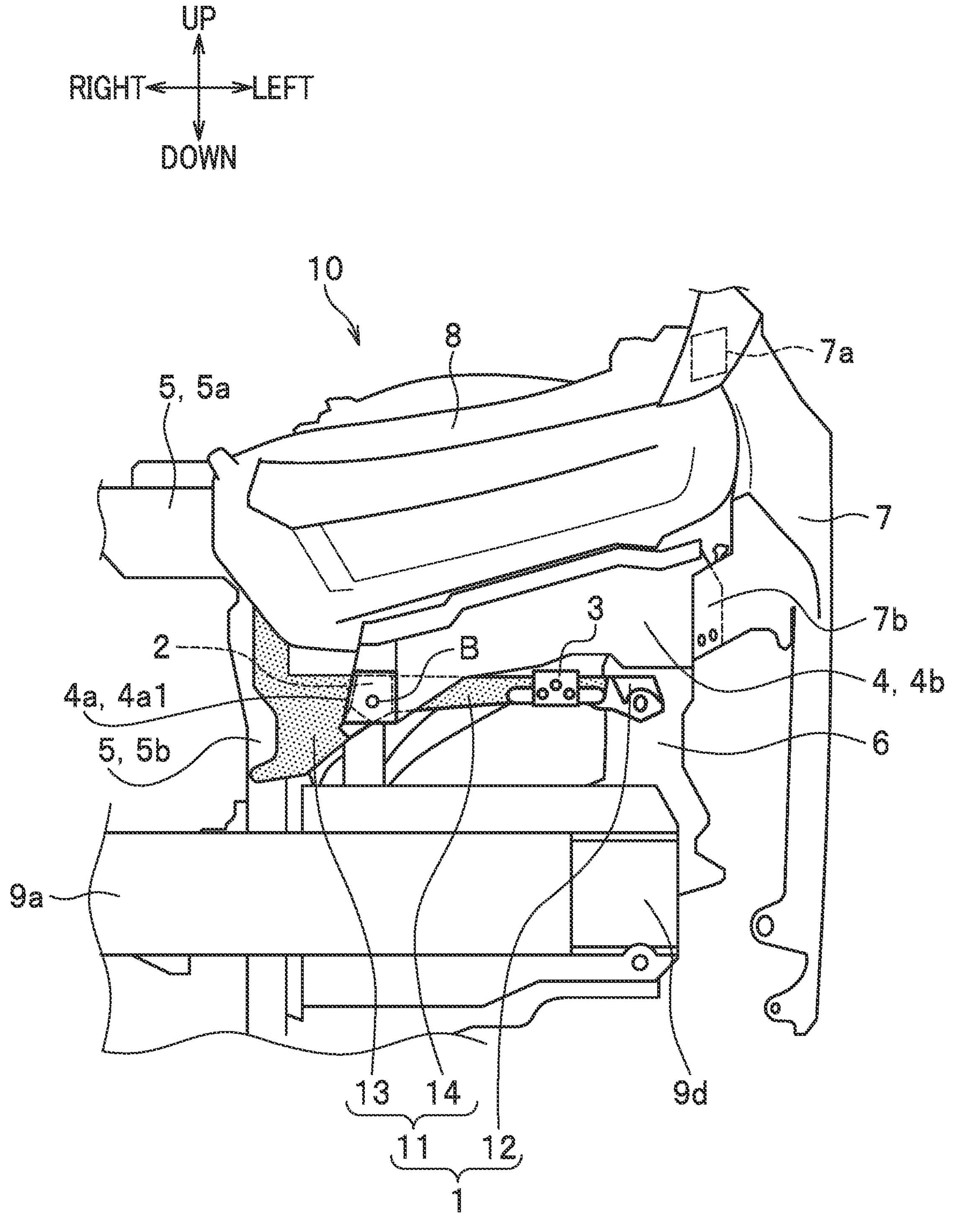
FIG. 2 is a partially-enlarged front view of the left section of the vehicle front structure in FIG. 1.
Figure 3:
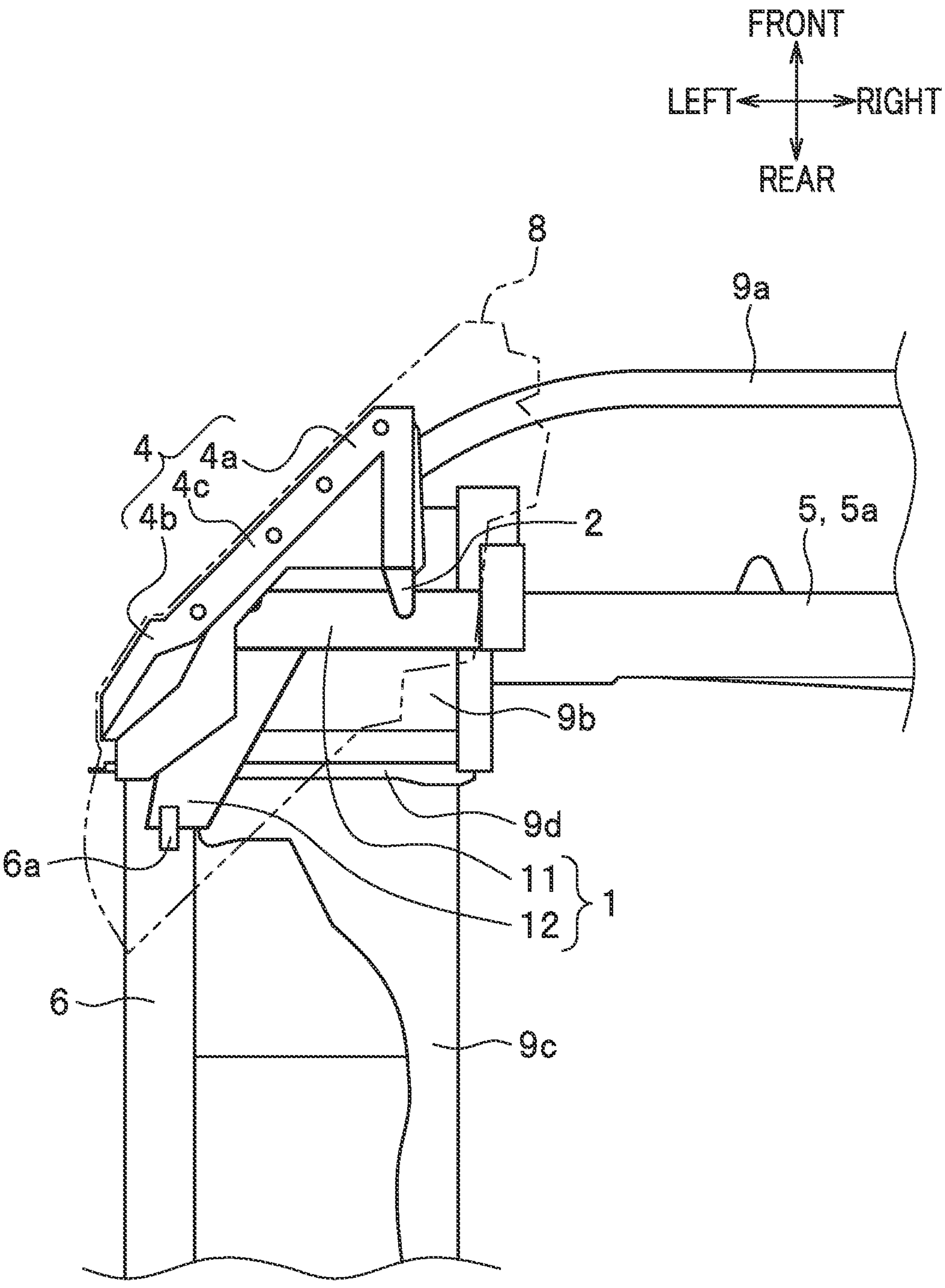
FIG. 3 is a partially-enlarged top view of the left section of the vehicle front structure in FIG. 1.

FIG. 1 is a partially-enlarged perspective view of a left section of a vehicle front structure 10 according to the present embodiment. FIG. 2 is a partially-enlarged front view of the left section of the vehicle front structure 10 in FIG. 1. FIG. 3 is a partially-enlarged top view of the left section of the vehicle front structure 10 in FIG. 1. Note that a headlight 8 in FIG. 3 is shown with an imaginary line (dash-dot-dot line) for the purpose of illustration. As shown in FIG. 1, the vehicle front structure 10 includes the headlight 8, an upper beam 4 to which the headlight 8 is fixed, and a bracket 1 to which an airbag sensor 8 is attached.

The headlight 8 of the present embodiment is formed horizontally long and arranged above a bumper beam extension 9*b* at a front corner of the vehicle. As shown in FIG. 2, an inner end in a vehicle width direction of the headlight 8 is supported by an outer end in the vehicle width direction of an upper lateral member 5*a* of a rectangular frame member of a bulkhead 5. An outer end in the vehicle width direction of the headlight 8 is engaged with an engaging portion 7*a* of a fender panel 7. The headlight 8 as described above is fixed, at a lower portion thereof, to the upper beam 4 via fasteners 8*a* aligned in a longitudinal direction thereof, as shown in FIG. 1.

The upper beam 4 is formed horizontally long below the headlight 8 so as to extend in a longitudinal direction of the headlight 8, as shown in FIG. 2. Note that a first bracket 11 is shaded in FIG. 2 for the purpose of illustration. In particular, the upper beam 4 is arranged so as to have a front surface thereof overlapped in the up-down direction with a front surface of the headlight 8, as shown in FIG. 3. The upper beam 4 has a front portion 4*a* and a rear portion 4*b* across a constricted portion 4*c* at a center in the front-rear direction, in a planar view in FIG. 3.

As shown in FIG. 2, the front portion 4*a* of the upper beam 4 is formed with a fastened segment 4*a*1 to be fastened by a bolt B to a shock absorbing bracket 2, to be described below. Note that the shock absorbing bracket 2 is shown with a hidden line (dotted line) in FIG. 2. The front portion 4*a* of the upper beam 4 is supported by the bracket 1 via the shock absorbing bracket 2. As shown in FIG. 2, the rear portion 4*b* of the upper beam 4 extends rearward (toward a far side on a plane of paper in FIG. 2) above the bracket 1 and is joined to a joining segment 7*b*, extending frontward from an inner portion in the vehicle width direction, of the fender panel 7.

Figure 4:
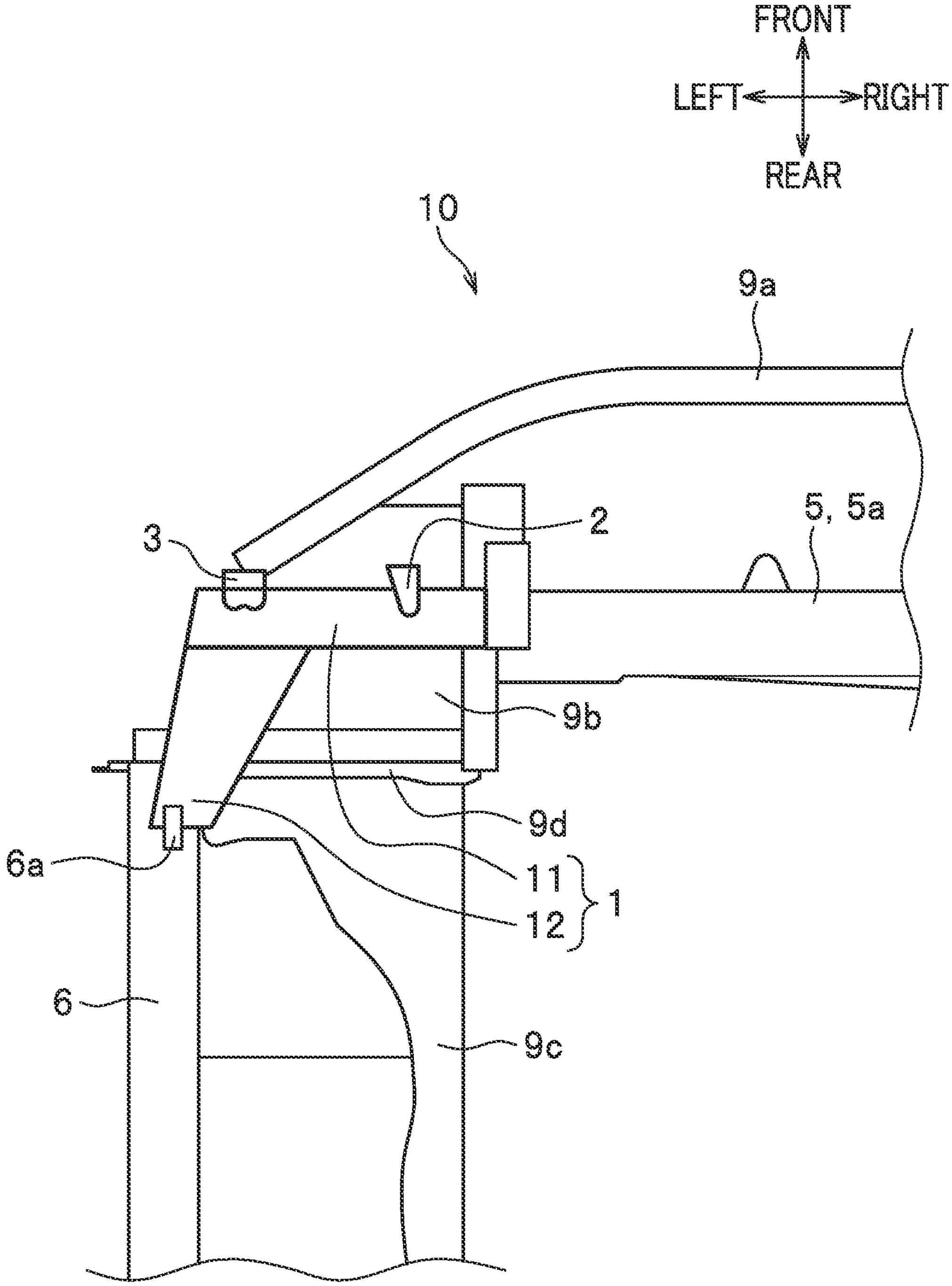
FIG. 4 is a partially-enlarged top view of the left section of the vehicle front structure in FIG. 1, with a headlight and an upper beam removed.

Next, the bracket 1 (see FIG. 1) is described. FIG. 4 is a partially-enlarged top view of the left section of the vehicle front structure 10 in FIG. 1, with the headlight 8 (see FIG. 3) and the upper beam 4 (see FIG. 3) removed. As shown in FIG. 4, the bracket 1 has the first bracket 11 and a second bracket 12 joined to each other, to have a chevron shape in a planar view.

The first bracket 11 has a rectangular shape elongated in the vehicle width direction, in a planar view in FIG. 4. The first bracket 11 extends in parallel to the vehicle width direction. The second bracket 12 is in a trapezoidal shape with a height defined in the front-rear direction, in a planar view in FIG. 4. In particular, the second bracket 12 has a bottom base, longer than a top base, positioned in the front and the top base positioned in the rear, so as to have a lateral width gradually widened as it extends frontward.

The first bracket 11 has a base end 13 in a substantially right triangle shape in a front view in FIG. 2, with a width being gradually widened downward as it extends inward in the vehicle width direction, starting from a portion thereof, as a boundary, to have the shock absorbing bracket 2 to be described below. Additionally, the first bracket 11 has an extension 14 extending outward in the vehicle width direction from the base end 13 and supporting the airbag sensor 3. The extension 14 has the second bracket 12 joined thereto.

Figure 5:
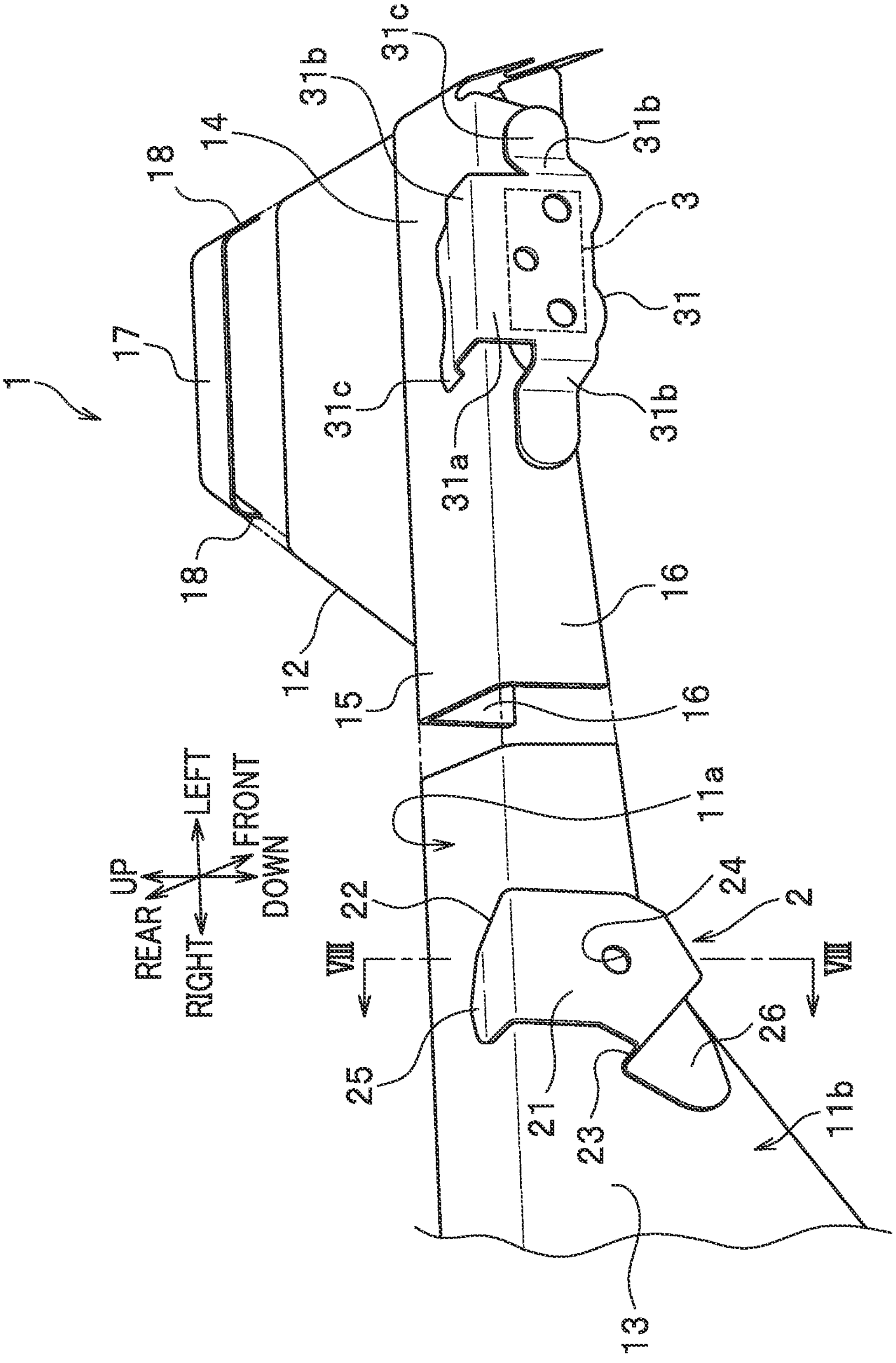
FIG. 5 is an overall perspective view of a bracket of the vehicle front structure in FIG. 1.
Figure 6:
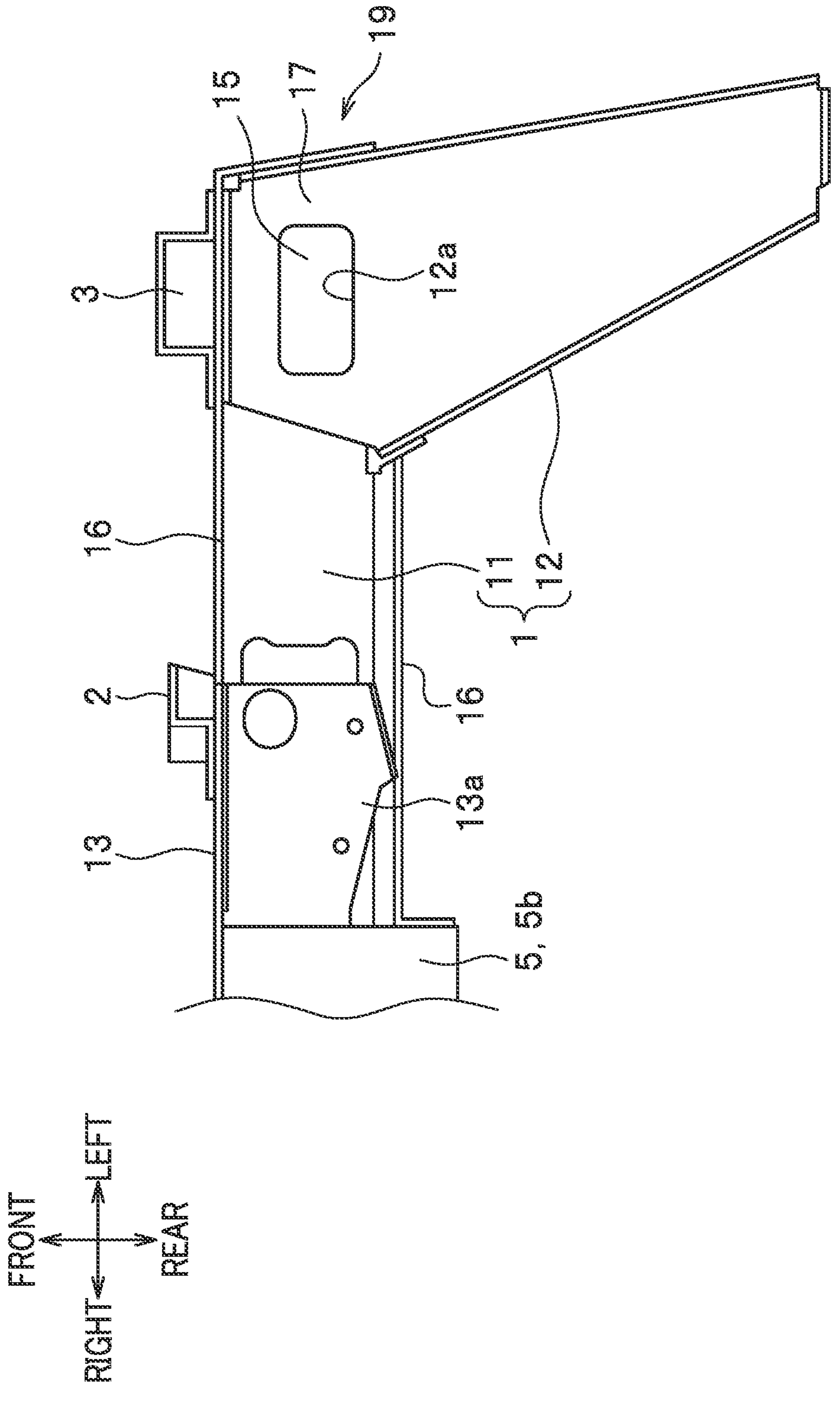
FIG. 6 is a bottom view of the bracket in FIG. 5.
Figure 7:
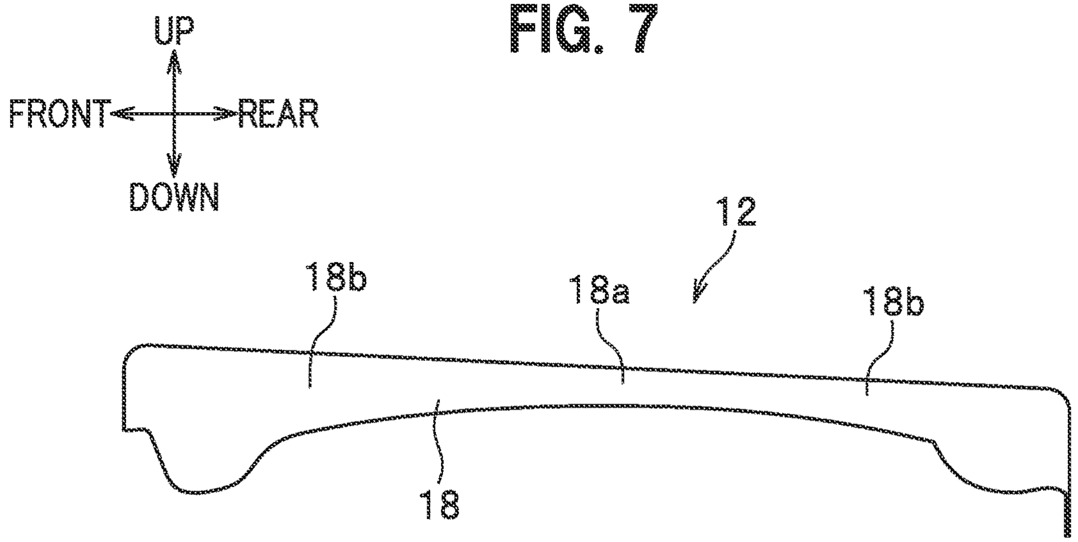
FIG. 7 is a side view of a second bracket of the bracket in FIG. 5.

FIG. 5 is an overall perspective view of the bracket 1. FIG. 6 is a bottom view of the bracket 1. FIG. 7 is a side view of the second bracket 12. As shown in FIG. 5, the first bracket 11 is formed of a folded plate. The first bracket 11 has an angled U-shape in cross section in a plane normal to a longitudinal direction thereof (right-left direction in FIG. 5), as shown with itself partly cut out. In particular, the first bracket 11 includes an upper wall 15 facing in the up-down direction, and a pair of sidewalls 16 formed at both open ends in the front-rear direction of the angled U-shape.

As shown in FIG. 5, the second bracket 12 is formed of a folded plate. The second bracket 12 has an angled U-shape in cross section in a plane normal to a longitudinal direction thereof (front-rear direction in FIG. 5), as shown with itself partly cut out. In particular, the second bracket 12 includes an upper wall 17 facing in the up-down direction, and a pair of sidewalls 18 formed at both open ends in the right-left direction of the angled U-shape.

As shown in FIG. 6, the first bracket 11 and the second bracket 12 are joined to each other, with a front portion of the upper wall 17 of the second bracket 12 overlapped with an outer portion in the vehicle width direction of the upper wall 15 of the first bracket 11. Note that no rear wall exists in the pair of front and rear sidewalls 16 of the first bracket 11 at a connection between the first bracket 11 and the second bracket 12.

The second bracket 12 is formed with a hollow 12*a* at a connection 19 with the first bracket 11. Accordingly, the bracket 1 is reduced in weight yet enhanced in rigidity at the connection 19. Note that joining of the first bracket 11 and the second bracket 12 in the present embodiment is assumed to be done by welding such as spot welding, but may be done by other joining method such as bolting.

The sidewall 18 (see FIG. 5) of the second bracket 12 (see FIG. 5) extending rearward from the first bracket 11 (see FIG. 5) is formed in an arch shape so as to be concave upward, as shown in FIG. 7. That is, the sidewall 18 has a middle portion 18*a* in the front-rear direction thereof shorter in length in the up-down direction than both end portions 18*b* in the front-rear direction thereof. This makes the second bracket 12 weaker than the first bracket 11 (see FIG. 5) with respect to a load applied in the front-rear direction.

Back to FIG. 6, the base end 13 of the first bracket 11 is provided with a reinforcing member 13*a*. The reinforcing member 13*a* has an angled U-shape in cross section, although not shown, and is arranged inside the first bracket 11 and joined to the upper wall 15 and sidewalls 16 of the first bracket 11. The bracket 1 is connected, by the first bracket 11 having the reinforced base end 13 as described above, to a left vertical member 5*b* of the bulkhead 5. In particular, the first bracket 11 is connected, at a position above a bumper beam 9*a*, to a middle portion in the up-down direction of the left vertical member 5*b*, in a front view in FIG. 2.

In addition, the bracket 1 is connected with a connection 6*a* of a lower member 6 at a rear end of the second bracket 12 extending from the first bracket 11, as shown in FIG. 4. Incidentally, the lower member 6 is arranged on an outer side in the vehicle width direction of a front side frame 9*c*. In particular, the lower member 6 extends rearward from a coupling plate 9*d*, which is shared with the front side frame 9*c*, so as to be curved as being convex upward, as shown in FIG. 1, and is connected to a front end of an upper member (not shown). The connection 6*a* of the present embodiment between the second bracket 12 and the lower member 6 is posterior to a rear of the upper beam 4, as shown in FIG. 1.

Next, a description is given of the airbag sensor 3 (see FIG. 5) and shock absorbing bracket 2 (see FIG. 5), which are attached to the first bracket 11 (see FIG. 5). Note that the airbag sensor 3 is shown with a hidden line (dotted line) in FIG. 5. The airbag sensor 3 (Front Crash Sensor or FCS) is attached, in front of the second bracket 12, to the first bracket 11 (extension 14), as shown in FIG. 5. In particular, the airbag sensor 3 is attached by a sensor bracket 31 to a front lateral face 11*b* of the first bracket 11.

As shown in FIG. 5, the sensor bracket 31 includes a support plate 31*a* in a substantially rectangular shape to support the airbag sensor 3 on a back surface thereof, leg plates 31*b* extending rearward respectively from upper, right, and left edges of the support plate 31*a*, and flanges 31*c* formed at extension ends of the leg plates 31*b*. Here, the flange 31*c* of the leg plate 31*b* extending from the upper edge of the support plate 31*a* is spot welded to a top face 11*a* of the first bracket 11. Additionally, the flanges 31*c* of the leg plates 31*b* extending from the right and left edges of the support plate 31*a* are spot welded to the front lateral face 11*b* of the first bracket 11.

The shock absorbing bracket 2 is arranged so as to be held between the upper beam 4 and the bracket 1, as shown in FIG. 3. In particular, the shock absorbing bracket 2 is arranged at a boundary between the base end 13 and extension 14 of the first bracket 11, as shown in FIG. 5.

The shock absorbing bracket 2 of the present embodiment is formed of a folded metal plate. In particular, the shock absorbing bracket 2 includes fastening plate 21 to have the upper beam 4 (see FIG. 2) fastened thereto, a leg plate 22 extending rearward from an upper edge of the fastening plate 21, a leg plate 23 extending rearward from a lower edge of the fastening plate 21, a flange 25 formed at an extension end of the leg plate 22, and a flange 26 formed at an extension end of the leg plate 23, as shown in FIG. 5. That is, the shock absorbing bracket 2 has an angled U-shape with the fastening plate 21, leg plate 22, and leg plate 23, when viewed laterally in the right-left direction.

The fastening plate 21 is arranged to face in the front-rear direction. The fastening plate 21 is formed, at a substantially center thereof, with a fastening hole 24, to be described below, through which the bolt B (see FIG. 8) is screwed. The fastening hole 24 corresponds to a "hole in the shock absorbing bracket" in one or more claims. The fastening plate 21 has a lower portion thereof dislocated rightward in a front view, that is, toward the base end 13, than an upper portion thereof. The flange 25 formed at the leg plate 22 is arranged so as to extend along the top face 11*a* of the first bracket 11 and spot welded to the top face 11*a*. The flange 26 formed at the leg plate 23 is arranged so as to extend along the front lateral face 11*b* of the first bracket 11. In particular, the flange 26 extends along a sloping lower edge of the base end 13, due to the lower portion of the fastening plate 21 being dislocated rightward, and is spot welded to the lateral face 11*b*.

Figure 8:
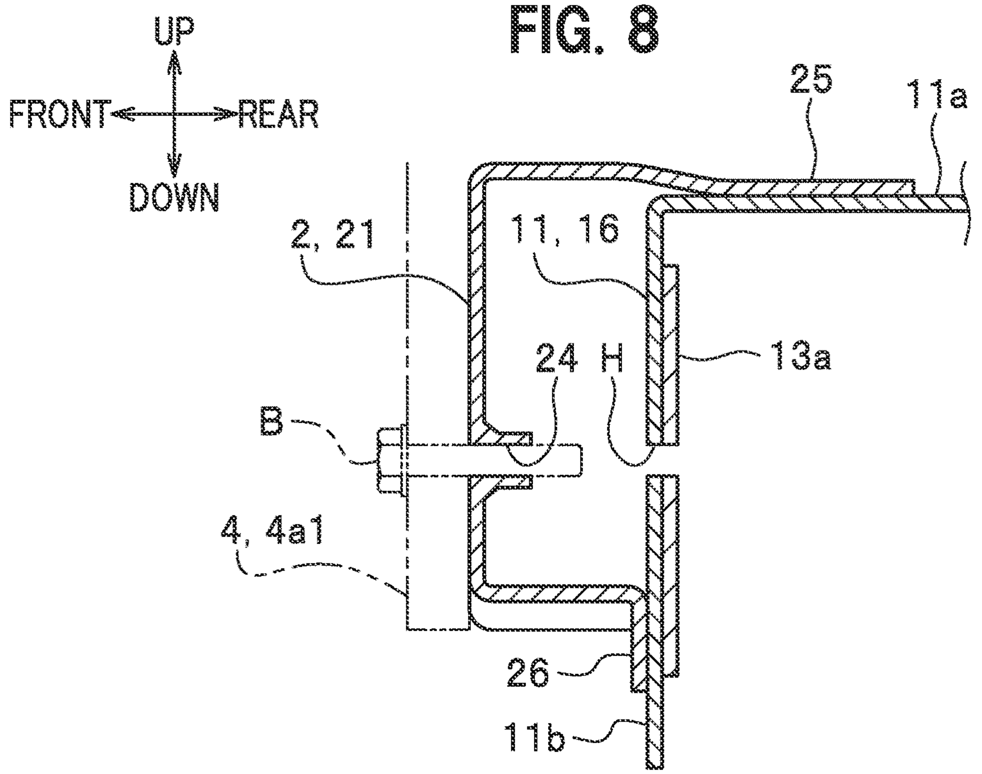
FIG. 8 is a cross-sectional view, taken along a line VIII-VIII in FIG. 5.

FIG. 8 is a cross-sectional, taken along a line VIII-VIII in FIG. 5. Note that the reference sign 4*a*1 in FIG. 8 indicates the fastened segment of the upper beam 4 in FIG. 2 shown with an imaginary line (dash-dot-dot line), and the reference sign B indicates the fastening bolt shown with an imaginary line (dash-dot-dot line). The reference sign 25 indicates the flange joined to the top face 11*a* of the first bracket 11. The reference sign 26 indicates the flange joined to the front lateral face 11*b* of the first bracket 11.

As shown in FIG. 8, the fastening plate 21 of the shock absorbing bracket 2 has the fastened segment 4*a*1 of the upper beam 4 fastened by the bolt B, as described above. The front sidewall 16 of the first bracket 11 of the present embodiment and the reinforcing member 13*a* overlapped with the front sidewall 16 have a hole H penetrating the two in the front-rear direction. The hole H is formed so as to be aligned in the front-rear direction with the fastening hole 24 formed in the fastening plate 21 of the shock absorbing bracket 2.

ADVANTAGEOUS EFFECTS

Next, a description is given of advantageous effects of the vehicle front structure 10 according to the present embodiment. The vehicle front structure 10 includes the shock absorbing bracket 2 arranged so as to be held between the bracket 1, fastened to the bulkhead 5 and the lower member 6, and the upper beam 4, wherein the airbag sensor 3 is arranged in vicinity to the shock absorbing bracket 2. The vehicle front structure 10 with this feature has the shock absorbing bracket 2 crushed by the upper beam 4, which is moved backward by an impact load in the event of a frontal collision, to prevent a noise due to the collision load from being mixed into the airbag sensor 3 arranged in vicinity to the shock absorbing bracket 2. Additionally, the vehicle front structure 10 with this feature allows the load, transmitted from the upper beam 4 via the shock absorbing bracket 2 to the bracket 1, to be dispersed to the bulkhead 5 and the lower member 6. Also, the vehicle front structure 10 with this feature has the shock absorbing bracket 2 as a single part, separated from the bracket 1 and/or the upper beam 4, to facilitate replacing a part readily and inexpensively, unlike in the case of a conventional vehicle front structure (see Patent Document 1, for example) having the inner support and headlamp-fixed frame integrally molded. As the shock absorbing bracket 2 is a single part, the vehicle front structure 10 has higher degree of freedom in design on an installation site of the shock absorbing bracket 2, and higher versatility.

Further, the vehicle front structure 10 has the shock absorbing bracket 2 in an angled U-shape. The vehicle front structure 10 with this feature allows the shock absorbing bracket 2 to be stably attached to the bracket 1 at two open ends of the angled U-shape. Additionally, the vehicle front structure 10 with this feature allows for designing lengths, sizes, and shapes of components (the fastening plate 21 and the leg plates 22, 23), to form the angled U-shape, readily and freely so as to be fitted to a shape of the bracket 1 to which the shock absorbing bracket 2 is attached.

Still further, the vehicle front structure 10 has the flange 25 of the shock absorbing bracket 2 fixed to the top face 11*a* of the bracket 1 (first bracket 11) and the flange 26 fixed to the lateral face 11*b* of the bracket 1 (first bracket 11). The vehicle front structure 10 with this feature allows for avoiding a tearing stress being applied in the same direction at surfaces on which the flanges 25, 26 are respectively joined to the bracket 1 (first bracket 11), in the event that an impact load is inputted to the shock absorbing bracket 2. This strengthens joining of the flanges 25, 26 to the bracket 1 (first bracket 11), to allow the shock absorbing bracket 2 to stably absorb an impact load.

Still further, the shock absorbing bracket 2 of the vehicle front structure 10 is made of metal. The vehicle front structure 10 with this feature allows for readily controlling an impact value in the event that the shock absorbing bracket 2 is broken due to an inputted load, unlike in the case of a conventional vehicle front structure (see Patent Document 1, for example) having a bumper support bracket, corresponding to the shock absorbing bracket 2, being made of resin.

Still further, the bracket 1 of the vehicle front structure 10 has an angled U-shape in cross section. The vehicle front structure 10 with this feature has the bracket 1 less likely deformed elastically, to have a higher natural resonance frequency. This improves a noise immunity (vibration tolerance) for the airbag sensor 3, to prevent erroneous detection of the airbag sensor 3 more reliably.

Still further, the vehicle front structure 10 has the first bracket 11 of the bracket 1 extending in parallel to the vehicle width direction. The vehicle front structure 10 with this feature allows the shock absorbing bracket 2 to be readily attached to the front sidewall 16 of the first bracket 11. Still further, the vehicle front structure 10 allows for transmitting an impact load inputted from the upper beam 4 to the front sidewall 16 of the first bracket 11 via the shock absorbing bracket 2. The vehicle front structure 10 with this feature allows the shock absorbing bracket 2 to be crushed effectively and more reliably, between the upper beam 4 and the sidewall 16 of the first bracket 11. An impact load is thus effectively absorbed in the event of a frontal collision.

Still further, the vehicle front structure 10 has the second bracket 12 weaker than the first bracket 11. The vehicle front structure 10 with this feature allows the first bracket 11, having higher strength and rigidity than the second bracket 12, to have higher natural vibration frequency. If an impact load exceeding a predetermined threshold is inputted to displace the first bracket 11 rearward, the second bracket 12 weaker than the first bracket 11 is broken earlier than the first bracket 11. That is, the bracket 1 of the vehicle front structure 10 is secured by the first bracket 11 having a higher natural resonance frequency, to have a superior noise immunity (vibration tolerance) for the airbag sensor 3. Accordingly, the vehicle front structure 10 with this feature prevents malfunction of the airbag, to allow the airbag sensor 3 to detect collision information required for deploying the airbag, with high accuracy at an early stage.

Still further, the second bracket 12 of the vehicle front structure 10 has a length in the vehicle width direction thereof increased as it extends frontward. The vehicle front structure 10 with this feature has an area of the connection 19 of the second bracket 12 to the first bracket 11 increased, and the second bracket 12 has the length in the vehicle width direction thereof decreased as it extends rearward. This causes the second bracket 12 to have an increased acceptable amount (acceptable load amount) of the load inputted to the first bracket 11, and improved performance of transmitting a load to the lower member. The vehicle front structure 10 effectively disperses a load inputted to the bracket 1 to the lower member 6.

Still further, the vehicle front structure 10 is formed to have the fastening hole 24 in the shock absorbing bracket 2 aligned in the front-rear direction with the hole H penetrating the sidewall 16 of the first bracket 11 and the reinforcing member 13*a*. The vehicle front structure 10 with this feature has a rear end of the bolt B fastened into the fastening hole 24 entering into the hole H, when the shock absorbing bracket 2 is moved backward in the event of a frontal collision. The vehicle front structure 10 with this feature secures a long backward stroke of the shock absorbing bracket 2, to have the shock absorbing bracket 2 effectively crushed. An impact load is thus effectively absorbed in the event of a frontal collision.

Hereinabove, the embodiment of the present invention has been described, but the present invention is not limited thereto and can be implemented in various modes. The bracket 1 (first bracket 11) is formed to have an angled U-shape in cross section in the vehicle front structure 10 of the embodiment. However, the bracket 1 (first bracket 11) may be formed to have a closed rectangular section, for example. In a case where the vehicle front structure 10 has the bracket 1 (first bracket 11) formed to have at least the side wall 16 and a bottom wall to form a bottom face, the shock absorbing bracket 2 may be configured to have a flange to be joined to the bottom face in place of, or in addition to, the flange 25.

In addition, a component of the vehicle front structure 10, to which the airbag sensor 3 and the sensor bracket 31 are attached, is not limited to the first bracket 11. The airbag sensor 3 and the sensor bracket 31 may be attached to a member directly or indirectly connected to the shock absorbing bracket 2 and having a load transmitted later than the shock absorbing bracket 2 or a place where a load is transmitted later than the shock absorbing bracket 2. Note that having the airbag sensor 3 and the sensor bracket 31 attached to the first bracket 11 results in having the airbag sensor 3 and the sensor bracket 31 arranged in vicinity to the shock absorbing bracket 2, to allow for sensing an impact load with higher accuracy.

LIST OF REFERENCE SIGNS

1: bracket, 2: shock absorbing bracket, 3: airbag sensor, 4: upper beam, 5: bulkhead, 6: lower member, 8: headlight, 10: vehicle front structure, 11: first bracket, 12: second bracket, 24: fastening hole (hole in shock absorbing bracket), 25: flange of shock absorbing bracket (one of the flanges), 26: flange of shock absorbing bracket (the other of the flanges), and H: hole in first bracket.

What is claimed is:

1. A vehicle front structure comprising:
- an upper beam to which a headlight is fixed;
- a fastening bracket installed side by side with the upper beam and having a front end in a vehicle front-rear direction thereof fixed to a bulkhead and a rear end in the vehicle front-rear direction thereof fixed to a lower member;
- a shock absorbing bracket arranged so as to be held between the upper beam and the fastening bracket; and
- an airbag sensor arranged in vicinity to the shock absorbing bracket.

2. The vehicle front structure according to claim 1, wherein
- the shock absorbing bracket has a U-shape, in a lateral view.

3. The vehicle front structure according to claim 2, wherein
- the shock absorbing bracket has a flange at each end of the open side of the U-shape, and
- one of the flanges is fixed to a top face or bottom face of the fastening bracket and the other of the flanges is fixed to a lateral face of the fastening bracket.

4. The vehicle front structure according to claim 1, wherein
- the shock absorbing bracket is made of metal.

5. The vehicle front structure according to claim 1, wherein
- the fastening bracket has a U-shape in cross section.

6. The vehicle front structure according to claim 1, wherein
- the fastening bracket includes:
- a first bracket extending in parallel to a vehicle width direction; and
- a second bracket joined to the first bracket and extending rearward from a connection with the first bracket.

7. The vehicle front structure according to claim 6, wherein
- the second bracket is weaker than the first bracket.

8. The vehicle front structure according to claim 6, wherein
- the second bracket has a length in the vehicle width direction thereof increased as it extends frontward.

9. The vehicle front structure according to claim 6, wherein
- the shock absorbing bracket and the first bracket are each formed with a hole, and
- the hole in the shock absorbing bracket is formed so as to be aligned in a vehicle front-rear direction with the hole in the first bracket.

* * * * *